US007217938B2

(12) United States Patent
Hoffmeier

(10) Patent No.: US 7,217,938 B2
(45) Date of Patent: May 15, 2007

(54) FILTER DEVICE WITH A UVC LAMP AND A CLEANING ARRANGEMENT FOR SAID UVC LAMP

(75) Inventor: Dieter Hoffmeier, Ibbenbüren (DE)

(73) Assignee: Oase Wübker GmbH & Co., KG, Hörstel (DE)

( * ) Notice: Subject to any disclaimer, the term of this patent is extended or adjusted under 35 U.S.C. 154(b) by 179 days.

(21) Appl. No.: 10/490,544

(22) PCT Filed: Sep. 24, 2002

(86) PCT No.: PCT/DE02/03591

§ 371 (c)(1),
(2), (4) Date: May 17, 2004

(87) PCT Pub. No.: WO03/027026

PCT Pub. Date: Apr. 3, 2003

(65) Prior Publication Data
US 2004/0262236 A1    Dec. 30, 2004

(30) Foreign Application Priority Data
Sep. 25, 2001    (DE) ................................ 101 47 019

(51) Int. Cl.
  *A61N 5/06*   (2006.01)
(52) U.S. Cl. ............................ 250/504 R; 250/453.11; 250/454.11; 250/455.11; 250/505.1; 250/498.1; 250/497.1

(58) Field of Classification Search ............ 250/504 R, 250/453.11–455.11, 505.1, 498.1, 497.1
See application file for complete search history.

(56) References Cited

U.S. PATENT DOCUMENTS

| 3,061,721 A | 10/1962 | Brenner |
| 7,081,636 B2 * | 7/2006 | Moruzzi .................. 250/504 R |
| 2002/0005385 A1 * | 1/2002 | Stevens et al. ............. 210/748 |

FOREIGN PATENT DOCUMENTS

| DE | 1 293 762 | 11/1968 |
| DE | 37 10250 A1 | 10/1988 |
| EP | 0 983 805 A2 | 3/2000 |
| GB | 1 213 706 | 11/1970 |
| WO | WO 99/40032 | 8/1999 |

* cited by examiner

*Primary Examiner*—Karabi Guharay
*Assistant Examiner*—Anthony Canning
(74) *Attorney, Agent, or Firm*—Cohen Pontani Lieberman & Pavane LLP

(57) ABSTRACT

A filter device with a UVC lamp for filtering fluids, with a lamp housing, which is installed in a flow of the fluid to be filtered and has a principal axis, is characterized by the fact that at least one cleaning element is arranged in contact with a fluid-side surface of the lamp housing and can rotate about an axis of rotation that coincides with the principal axis.

9 Claims, 3 Drawing Sheets

FILTER DEVICE WITH A UVC LAMP AND A CLEANING ARRANGEMENT FOR SAID UVC LAMP

PRIORITY CLAIM

This is a U.S. national stage of application No. PCT/DE02/03591, filed on 24 Sep. 2002. Priority is claimed on that application and on the following application(s): Country: Germany, Application No. 101 47 019.3, Filed: 25 Sep. 2001.

BACKGROUND OF THE INVENTION

1. Field of the Invention

The present invention concerns a filter device with a UVC lamp for filtering fluids, with a lamp housing, which is installed in a flow of the fluid to be filtered and has a principal axis.

2. Description of the Prior Art

A filter device of this type is known from the state of the art, e.g., for the filtration of pond water. A UVC lamp produces C-wave UV light, which serves to sterilize the fluid being filtered. Due to the fact that a UVC lamp of this type is installed in a filter device in fluid flows that carry a more or less large amount of suspended substances and comes into contact with these substances, the surface of the UVC lamp that faces the fluid periodically becomes contaminated and thus loses its filter effect.

In the state of the art, UVC lamps of this type are removed from the filter device and then manually cleaned with a cloth, a brush, or the like. Since this type of cleaning must be performed regularly and frequently, in the past various mechanisms were developed to simplify and facilitate the installation and removal of the UVC lamp in a filter device of this type.

However, the installation and removal of this type of UVC lamp for cleaning purposes continues to be a disruptive, time-consuming measure that interrupts the general filtration operation.

SUMMARY OF THE INVENTION

Therefore, the objective of the invention is to create a filter device whose UVC lamp can be cleaned without removing and reinstalling it.

In accordance with the invention, this objective is achieved by virtue of the fact that at least one cleaning element is arranged in contact with a fluid-side surface of the lamp housing and can rotate about an axis of rotation that coincides with the principal axis.

The solution in accordance with the invention now makes it possible to clean the lamp housing without removing and reinstalling it by rotating the one or more cleaning elements about the lamp housing in the installed state. This provides a simple way to perform regular cleaning of the fluid-side surface of the lamp housing.

For continuous cleaning, it is advantageous if the one or more cleaning elements are designed in such a way that the flow of the fluid being filtered causes the cleaning element(s) to rotate. This can be accomplished, for example, if the one or more cleaning elements run helically around the fluid-side surface of the UVC lamp between two retaining devices.

Alternatively or additionally, the one or more cleaning elements can be operatively connected on their axis of rotation with an impeller, so that the flow causes the impeller to rotate and thus indirectly causes the one or more cleaning elements to rotate.

In embodiments that have an impeller of this type, the one or more cleaning elements may also be designed straight, so that the drive occurs exclusively by the impeller.

Additional advantages are apparent from the features of the dependent claims.

BRIEF DESCRIPTION OF THE DRAWINGS

Embodiments of the present example are explained in greater detail below with reference to the drawings.

DETAILED DESCRIPTION OF THE PREFERRED EMBODIMENTS

Figure 1:
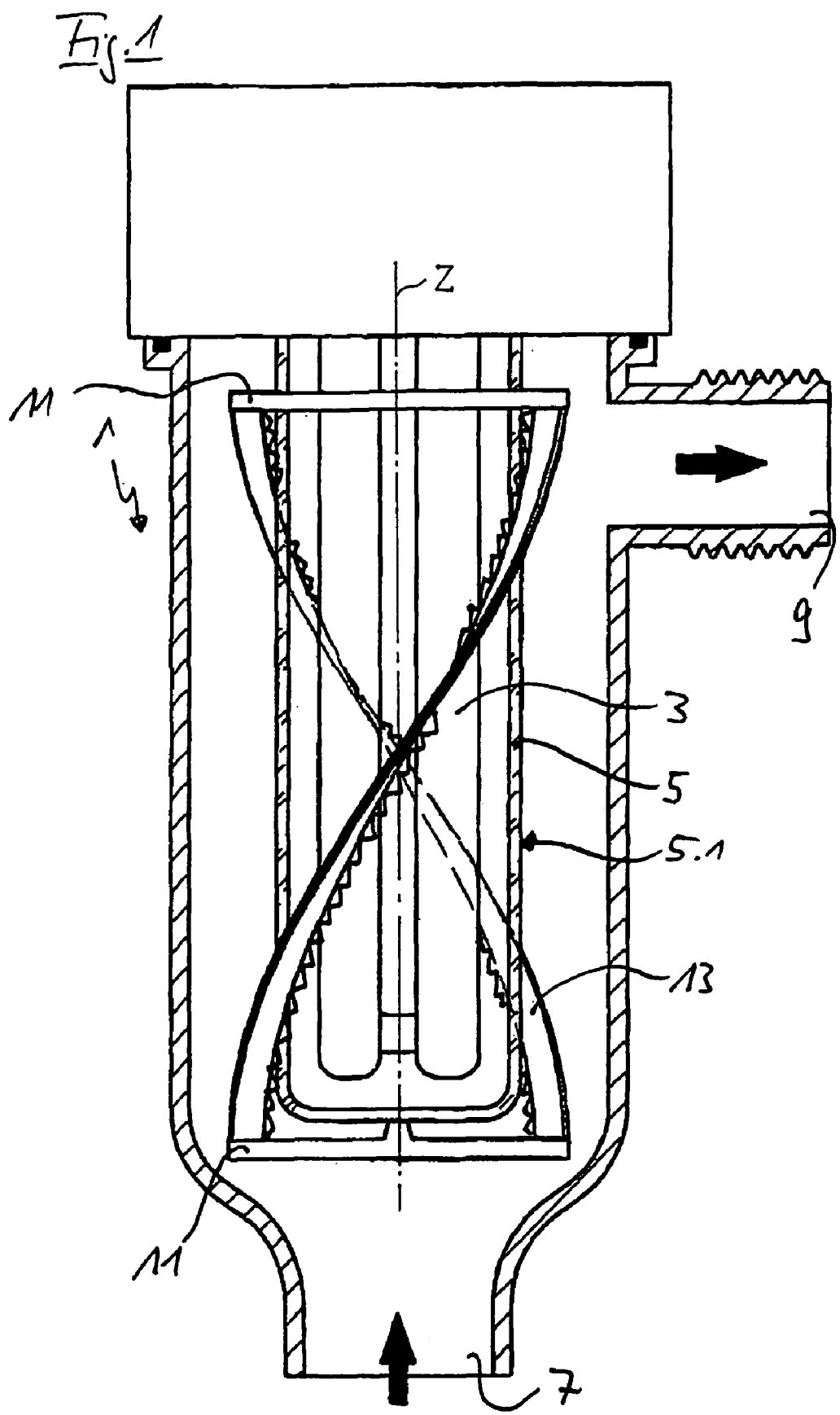
FIG. 1 is a schematic view of the UVC lamp in the filter device with an autorotating cleaning element in accordance with a first embodiment of the present invention.
Figure 2:
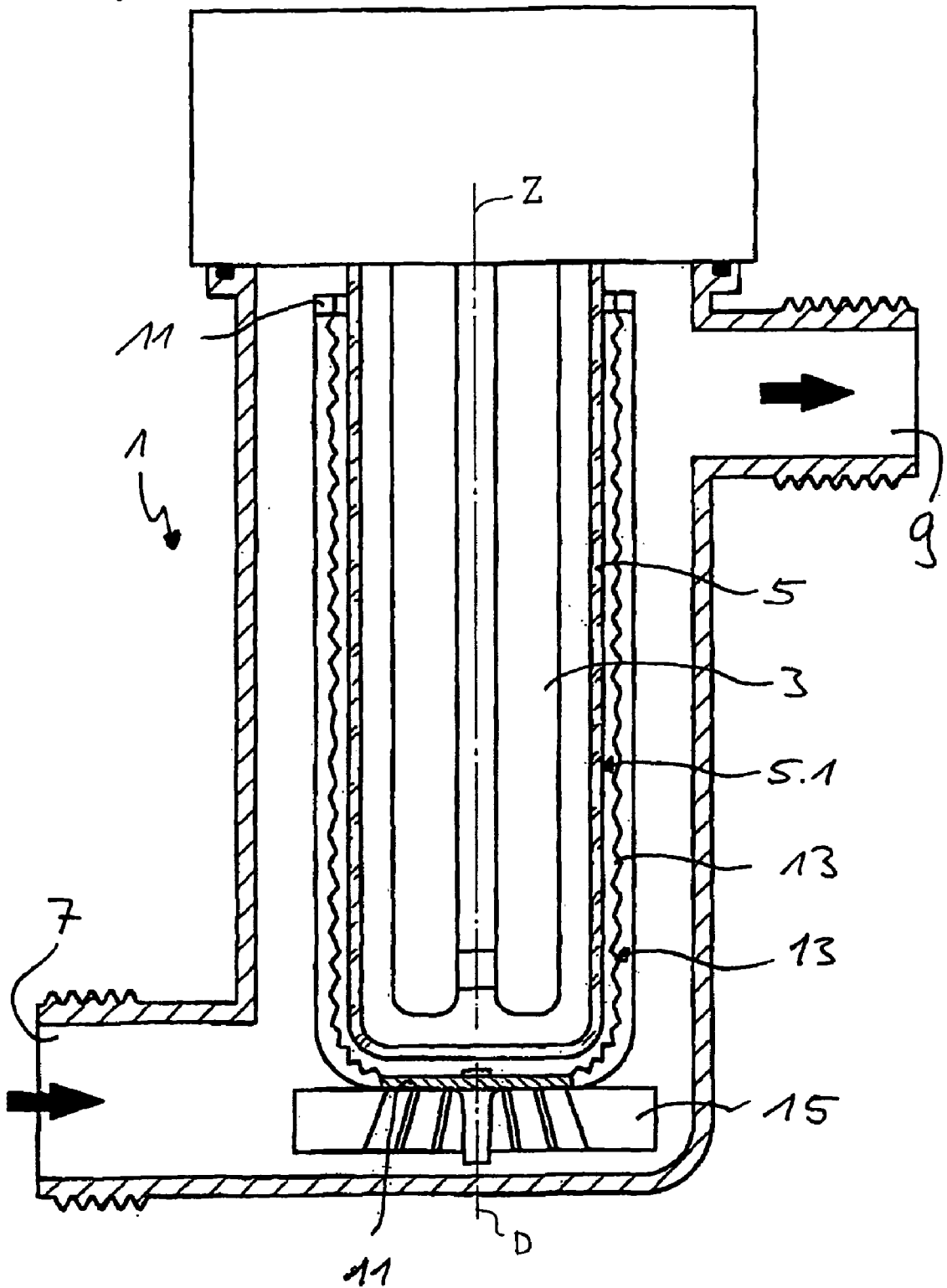
FIG. 2 is a schematic view of the UVC lamp in the filter device with a cleaning element driven by an impeller in accordance with a second embodiment of the present invention.

FIG. 1 and FIG. 2 show a flow housing 1, which is installed in a filter device in the flow path of a fluid to be filtered. A UVC lamp 3 with a lamp housing 5 is installed in the flow housing 1 in such a way that the fluid to be filtered can flow around the lamp housing 5, which has a principal axis Z in the vertical direction. The lamp housing 5 is cylindrical and has at least one rounded end. An upper portion of the flow housing 1 is tightly sealed, e.g., by a lamp ballast and/or a grip for pulling out the UVC lamp 3 together with the lamp housing 5.

In FIG. 1, the flow housing 1 has an intake opening 7, which is formed below or at the base, and a discharge opening 9, which is formed above at the side, so that the flow of the fluid to be filtered occurs from bottom to top.

Two retaining elements 11 are arranged around the lamp housing 5 concentrically with respect to the principal axis Z and some distance apart along the principal axis Z. Two cleaning elements 13 run helically between the retaining elements 11. In the present embodiment, the two cleaning elements 13 are arranged diametrically opposite each other and describe half a helical turn between the retaining elements 11.

The upwardly directed flow acts on the cleaning elements 13 and causes them to rotate about the fluid-side surface 5.1 of the lamp housing 5. The axis of rotation D coincides with the principal axis Z. The cleaning elements 13 are strips, which have a sponge-like, bristle-like, or fleece-like form or can be designed in some other suitable way to act mechanically on the fluid-side surface 5.1 and clean it.

Figure 4:
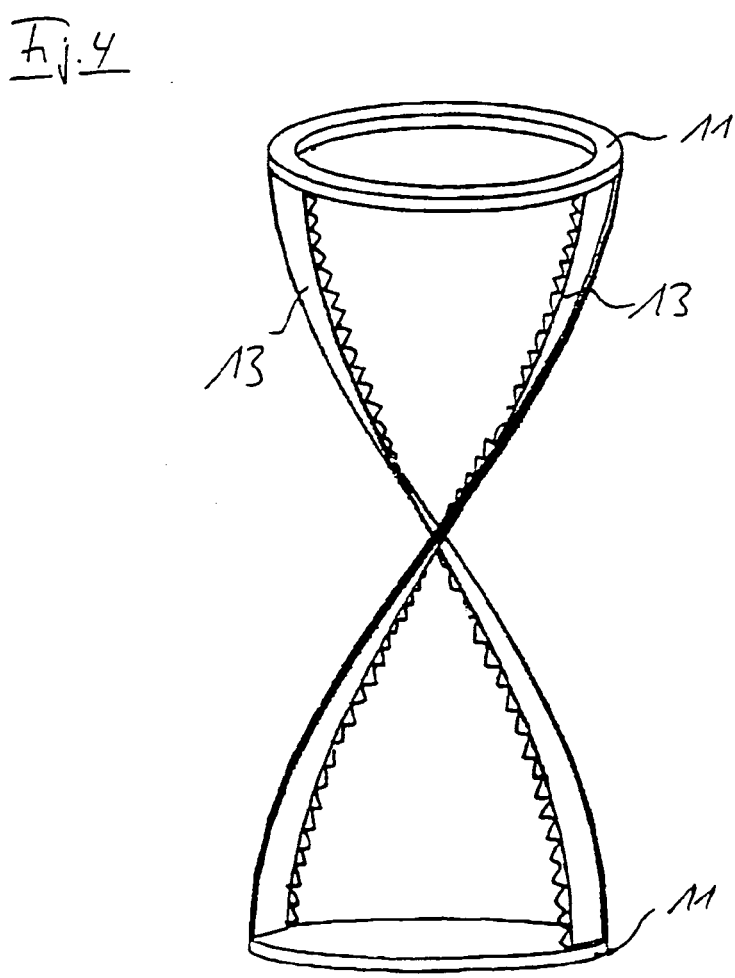
FIG. 4 is a schematic view of the cleaning element of the first embodiment, shown without the UVC lamp.

In FIG. 4, the cleaning elements 13 are shown separately. The vertical arrangement shown in FIGS. 1 and 4 and described above may also be turned 90° in other embodiments and would thus be a horizontal arrangement. The assignments "above" and "below" would then merely change to "to the left side" and "to the right side".

FIG. 2 shows a second embodiment. In addition to the above features of the first embodiment, the second embodiment has an impeller 15, which is installed upstream in the flow of the fluid to be filtered and on the axis of rotation D.

Figure 3:
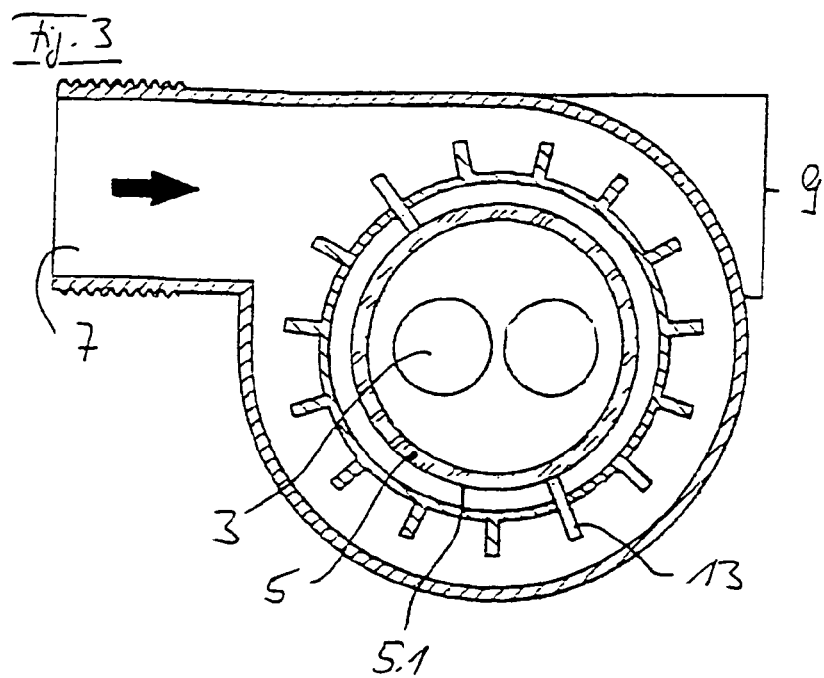
FIG. 3 is a schematic top view of the cleaning element of the second embodiment.

The impeller 15 is connected with the cleaning elements 13 by means that are already well known, so that rotation of the impeller 15 also causes rotation of the cleaning elements 13 and thus cleaning of the fluid-side surface 5.1. Therefore, in this second embodiment, it is not necessary for the cleaning elements 13 to have a helical configuration, but rather they may run straight, as is also shown in the top view in FIG. 3.

This second embodiment may also be arranged horizontally as well as vertically.

The intake opening 7 and the discharge opening 9 may be arranged diametrically with respect to each other at the corresponding ends or sides of the flow housing.

The invention claimed is:

1. A filter device for filtering fluids, comprising:
   a device housing having an inlet and an outlet and defining a space through which fluid flows between said inlet and said outlet;
   a UVC lamp having a lamp housing arranged in the space defined by said device housing in the flow of fluid to be filtered, the lamp housing having a principal axis and a fluid-side surface facing the fluid to be filtered;
   a pair of cleaning elements each arranged in contact with said fluid-side surface of said lamp housing and rotatable about an axis of rotation, wherein said axis of rotation coincides with said principal axis of said UVC lamp such that each of said cleaning elements contacts said fluid-side surface during rotation about said axis of rotation; and
   a pair of retaining elements spaced apart along said principal axis, each of said cleaning elements extending between said retaining elements along the fluid-side surface and being connected to said retaining elements such that said retaining elements support said cleaning elements, each of said cleaning elements being positioned diametrically opposite to the other of said cleaning elements relative to said principal axis and describing half a helical turn between said retaining elements.

2. The filter device of claim 1, wherein said cleaning elements are operatively arranged for rotating in response to the fluid flow from said inlet to said outlet.

3. The filter device of claim 2, further comprising an impeller rotatably mounted in said device housing for rotation about the axis of rotation and connected to at least one of said cleaning elements.

4. The filter device of claim 1, wherein each of said cleaning elements extends parallel to the principal axis.

5. The filter device of claim 1, wherein said UVC lamp is arranged in said device housing such that the principal axis extends substantially vertically, wherein said inlet is arranged at a lower section of said device housing and said outlet is arranged in an upper section of said device housing.

6. The filter device of claim 5, wherein said inlet and outlet are arranged on diametrically opposed sides of said device housing.

7. The filter device of claim 1, wherein said UVC lamp is arranged in said device housing such that the principal axis extends substantially horizontally, said inlet being arranged on one side of said device housing and said outlet being arranged on another side of said device housing.

8. The filter device of claim 7, wherein said inlet and outlet are arranged on diametrically opposed sides of said device housing.

9. The filter device of claim 1, wherein each of said cleaning elements comprises a strip of material extending along said fluid-side surface.

\* \* \* \* \*